(12) United States Patent
Cockerell

(10) Patent No.: US 11,842,655 B2
(45) Date of Patent: Dec. 12, 2023

(54) LABEL ASSEMBLY

(71) Applicant: AVERY DENNISON RETAIL INFORMATION SERVICES, LLC, Mentor, OH (US)

(72) Inventor: Peter Cockerell, Milton Keynes (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/188,275

(22) Filed: Nov. 12, 2018

(65) Prior Publication Data

US 2019/0147773 A1    May 16, 2019

Related U.S. Application Data

(60) Provisional application No. 62/584,318, filed on Nov. 10, 2017.

(51) Int. Cl.
*G09F 3/02*      (2006.01)
*B32B 3/08*      (2006.01)
(Continued)

(52) U.S. Cl.
CPC .................. *G09F 3/02* (2013.01); *B32B 3/08* (2013.01); *B32B 7/12* (2013.01); *B32B 37/12* (2013.01);
(Continued)

(58) Field of Classification Search
CPC ..... G09F 2003/0208; G09F 2003/0266; G09F 3/02; G09F 3/10; G09F 2003/0257;
(Continued)

(56) References Cited

U.S. PATENT DOCUMENTS 4,637,149 A * 1/1987 Rivkin .................... B42F 21/04
                                                                    40/593
4,639,149 A    1/1987 Bras et al.
(Continued)

FOREIGN PATENT DOCUMENTS

CN            203520769 U      4/2014
CN            204632247 U      9/2015
(Continued)

OTHER PUBLICATIONS

International Search Report and Written Opinion dated Feb. 14, 2019 issued in corresponding IA No. PCT/US2018/060579 filed Nov. 12, 2018.
(Continued)

*Primary Examiner* — Cassandra Davis

(57) ABSTRACT

A label stack assembly and method and system for preparing the label stack assembly is disclosed herein. The label stack assembly may be applied to a product in order to provide care instructions in multiple different languages. Individual pages of the label stack assembly may have separate content, such as translations of care instructions into multiple languages, and may be marked by tabs of various shapes, sizes, or styles that may protrude from an edge of the label stack assembly. Tabs may be marked with country codes indicating the translations or other information. The pages of the label stack assembly may be printed on both a front and a back side, such as may be desired, in order to minimize the number of pages used while maximizing the number of care instruction translations or other content pages.

16 Claims, 16 Drawing Sheets

(51) Int. Cl.
*B32B 7/12* (2006.01)
*B32B 37/12* (2006.01)
*B32B 43/00* (2006.01)
*G09F 3/10* (2006.01)

(52) U.S. Cl.
CPC .............. *B32B 43/006* (2013.01); *G09F 3/10* (2013.01); *B32B 2307/75* (2013.01); *B32B 2519/02* (2013.01); *G09F 2003/0222* (2013.01); *G09F 2003/0229* (2013.01); *G09F 2003/0241* (2013.01); *G09F 2003/0257* (2013.01)

(58) Field of Classification Search
CPC ..... G09F 2003/0222; G09F 2003/0229; G09F 2003/0241; B42D 9/001; B42D 9/008; B42F 21/04; B32B 3/08; B32B 7/12; B32B 37/12; B32B 43/006; B32B 2307/75; B32B 2519/02
USPC ............................................ 40/641; 229/67.2
See application file for complete search history.

(56) References Cited

U.S. PATENT DOCUMENTS

| | | | | |
|---|---|---|---|---|
| 4,907,825 | A * | 3/1990 | Miles | B42D 5/005 |
| | | | | 221/33 |
| 5,264,265 | A | 11/1993 | Kaufmann | |
| 5,284,363 | A | 2/1994 | Gartner et al. | |
| 5,286,546 | A | 2/1994 | Su | |
| 5,464,672 | A * | 11/1995 | Jackson | B42D 5/003 |
| | | | | 428/42.1 |
| 5,672,224 | A | 9/1997 | Kaufmann | |
| 6,254,960 | B1 | 7/2001 | Chen | |
| 6,447,862 | B1 | 9/2002 | Rankin et al. | |
| 6,620,275 | B1 * | 9/2003 | Avila | B31D 1/021 |
| | | | | 156/152 |
| 6,637,775 | B1 | 10/2003 | Bernier et al. | |
| 6,652,944 | B1 | 11/2003 | Spina | |
| 6,777,055 | B2 | 8/2004 | Janssen et al. | |
| 7,425,898 | B2 | 9/2008 | Ryckman | |
| 7,481,371 | B2 | 1/2009 | Heidorn | |
| 7,875,142 | B2 | 1/2011 | Matthews et al. | |
| 8,528,731 | B2 * | 9/2013 | Bratter | G09F 3/0288 |
| | | | | 206/447 |
| 9,378,451 | B2 | 6/2016 | Forster | |
| 2003/0091819 | A1 | 5/2003 | Franko, Sr. | |
| 2004/0041392 | A1 | 3/2004 | Seidl | |
| 2004/0121105 | A1 | 6/2004 | Janssen et al. | |
| 2004/0211510 | A1 | 10/2004 | Franko, Sr. | |
| 2004/0228996 | A1 | 11/2004 | Franzo | |
| 2005/0037172 | A1 * | 2/2005 | Adams | G09F 3/0288 |
| | | | | 428/40.1 |
| 2005/0106338 | A1 | 5/2005 | Maynard | |
| 2005/0184505 | A1 * | 8/2005 | Barlow | G09F 3/04 |
| | | | | 283/81 |
| 2006/0010743 | A1 * | 1/2006 | Fowler | G09F 3/10 |
| | | | | 40/638 |
| 2006/0051571 | A1 * | 3/2006 | Steinhardt | B32B 7/12 |
| | | | | 428/352 |
| 2006/0267572 | A1 * | 11/2006 | Sellars | G06K 19/07745 |
| | | | | 324/90 |
| 2007/0218236 | A1 * | 9/2007 | Klein | B29C 51/16 |
| | | | | 428/40.1 |
| 2009/0007475 | A1 * | 1/2009 | Pollock | B42F 7/00 |
| | | | | 40/641 |
| 2009/0167502 | A1 * | 7/2009 | Erickson | G06K 7/0008 |
| | | | | 340/10.3 |
| 2009/0201157 | A1 | 8/2009 | Forster | |
| 2010/0139138 | A1 * | 6/2010 | Miadich | A45C 11/182 |
| | | | | 40/641 |
| 2010/0261027 | A1 * | 10/2010 | Coccia | D21H 21/30 |
| | | | | 428/537.7 |
| 2011/0259775 | A1 | 10/2011 | Bratter et al. | |
| 2012/0175424 | A1 * | 7/2012 | Saint | G09F 3/005 |
| | | | | 235/492 |
| 2012/0268837 | A1 | 10/2012 | Rittenburg et al. | |
| 2013/0049349 | A1 * | 2/2013 | Feder | G06K 19/0776 |
| | | | | 283/75 |
| 2015/0118714 | A1 | 4/2015 | Kan | |
| 2015/0278671 | A1 | 10/2015 | Martin et al. | |
| 2016/0148086 | A1 * | 5/2016 | Clarke | G06K 19/07749 |
| | | | | 235/492 |
| 2016/0379022 | A1 | 12/2016 | Elizondo, II | |
| 2017/0036438 | A1 | 2/2017 | Antoniuk et al. | |
| 2019/0087705 | A1 * | 3/2019 | Bourque | G06K 19/07762 |
| 2021/0398459 | A1 * | 12/2021 | Cook | G09F 3/206 |

FOREIGN PATENT DOCUMENTS

| | | |
|---|---|---|
| CN | 105261293 | 1/2016 |
| CN | 105637538 | 6/2016 |
| CN | 105679181 | 6/2016 |
| CN | 206075706 U | 4/2017 |
| DE | 202012101813 | 10/2013 |
| DE | 102013107410 | 1/2015 |
| GB | 2277075 | 7/1993 |
| GB | 2277075 | 10/1994 |
| GB | 2401094 | 7/2006 |
| JP | 10-297091 | 11/1998 |
| JP | 2003-011939 | 1/2003 |
| JP | 2004/070272 | 3/2004 |
| JP | 2006/321073 | 11/2006 |
| JP | 2009-509233 | 3/2009 |
| JP | 2010/046361 | 3/2010 |
| JP | 3185825 | 2/2013 |
| WO | 2006/094152 | 9/2006 |
| WO | 2007/082995 | 7/2007 |
| WO | 2008/013216 | 1/2008 |
| WO | 2008/120474 | 10/2008 |
| WO | 2017/007880 | 1/2017 |
| WO | WO-2020086975 A1 * | 4/2020 ................ C09J 7/38 |

OTHER PUBLICATIONS

International Preliminary Report on Patentability dated May 22, 2020 issued in corresponding IA No. PCT/US2018/060579 filed Nov. 12, 2018.

* cited by examiner

LABEL ASSEMBLY

CROSS-REFERENCE TO RELATED APPLICATION(S)

The present application claims priority to and the benefit of United States provisional utility patent application No. 62/584,318 filed Nov. 10, 2017, which is incorporated herein by reference in its entirety.

BACKGROUND

Conventional labels, such as pressure sensitive labels, are typically manufactured from label stock. This label stock typically includes a substrate or face layer (face stock), onto which an adhesive layer is formed from an appropriate adhesive, such as a pressure sensitive adhesive (PSA), which may be adhered to the face layer. Finally, a protective release liner may be removably adhered to the adhesive layer to complete the process and protect the adhesive layer prior to application of the label. The label stock is generally provided in a continuous format or roll form. Individual labels may be produced by die cutting the face layer and the adhesive layer, and then removing the surrounding waste matrix, thereby leaving the individual labels adhered to the release liner in such a manner as to allow the individual labels to be readily peeled off of the release liner immediately prior to application of the label to an article or good.

One common problem associated with this method is that the resulting labels may have only a single functional layer, that is, only a single layer on which information can be printed. However, it may be desirable in certain circumstances to have multiple functional layers capable of receiving printing. For example, it may sometimes be necessary to construct a set of individual labels with different text information, such as languages, into a stack for attachment to an article or object. This necessitates a different, and typically more expensive, manufacturing method. It may also be difficult for a user to separate these labels from one another if it is necessary to do so, such as, for example, if one of the labels in particular is intended to be exposed, or if the labels are intended to be applied to a set of articles contained within a container.

When labels are arranged in a multi-layer stack, one of the labels may contain a far field long range RFID device, if this is desired. However, if more than one of the labels contains such a device, such that the stack has multiple far field RFID devices, the multiple far field RFID devices may interact with one another in a negative fashion and/or de-tune each other. This makes it very difficult to include multiple RFID devices in such a label stack, as their functionality will be significantly impeded. However, having multiple devices in the label may be desirable to determine whether all labels are present or if they individually relate to different parts of a structure. For example, it may be required to create a kit of parts in a common box, and in such a scenario the label from each part may be removed and combined in the common stack carrying the identity of all of the component elements. Alternatively, it may be desirable to determine that all of the labels expected to be in the stack are present without dismantling the stack.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a multiple part peel and reseal label stack assembly that may comprise one or more RFID devices, a base roll assembly for producing the label stack assembly, and a method for generating the same. Such an assembly may enable the RFID devices to be used to convey information to potential end users. The assembly may be provided with a plurality of informational sheets, or layers that may be printed with fixed or variable information, such as may be desired.

In accordance with one embodiment, the label assembly of the present invention comprises a base layer, which may have an adhesive disposed over all or substantially all of a surface area of the label, and which may allow the base layer to be affixed to an article. The label assembly may further comprise at least one informational layer stacked on the base layer; this informational layer may have at least one of fixed printed information (such as, for example, a translation of printed information that appears on a lower informational layer or on the base layer) or variable printed information (such as, for example, printed information corresponding to one of the parts or components of a container). At least one RFID device may be associated with at least one of the base layer or plurality of informational layers. In an exemplary embodiment, the base layer and subsequent informational layers may be permanently bound by an adhesive disposed proximate at least one edge of at least one of the base layer or the informational layers and the surfaces of the informational layers may be configured to repeatedly peel apart and reseal, other than where permanently bound by the adhesive to an article or other good.

A method for producing the label assembly of the present invention is also disclosed herein. The method comprises the steps of initially providing a web of material with the web having an adhesive and release liner, and then advancing the web of material to a first die station and die cutting the web of material into individual layers. The adhesive of the web may then be covered with a paper stock, and the web may be laminated to a liner material. The web may then be slit, and the individual layers may be assembled into a stack to create the label assembly. Next, a web containing a plurality of RFID devices may be provided, and at least one stack may be placed onto at least one RFID device. The at least one stack, having been placed onto the at least one RFID device, may be advanced to a testing and encoding station, where the RFID device may be tested and encoded with information relating to a an article or good, such as a consumer good. Finally, the label assemblies with RFID devices may be collected, and the label assemblies may be applied to an article.

In an alternative embodiment of the present invention, the label assembly may include a base layer having an adhesive disposed over all or substantially all of at least one side of its surface area, which may serve to allow the base layer to be affixed to an article or good. Further, a plurality of informational layers may be stacked on the base layer; this plurality of informational layers may each have at least one of fixed or variable printed information areas, such as, for example, fixed areas produced in at least two different languages. The base layer and subsequent informational layers may be removably or permanently bound by an adhesive disposed proximate at least one edge of at least one of the base layer or the informational layers and the surfaces of the plurality of informational layers may be configured to repeatedly peel apart and reseal, other than where permanently bound by the adhesive to an article or other good.

According to yet another exemplary embodiment, a label assembly may be produced by making use of a base roll which may be provided for a particular number of pages. However, it may instead be desirable to make use of a generic base roll that may be suitable for more than one page variant or all page variants. The use of such a generic base roll may generate economies of scale that result in cost savings across all production, and may likewise allow for smaller production runs to be economically produced, as it may no longer be necessary to make use of a base roll tailored for a specific number of pages. Likewise, the use of a generic base roll applicable to all production runs, rather than the use of specific base rolls for each production run, may allow for the reuse of the generic base rolls in other production runs if a production run is terminated early, which may result in less scrap being produced and cost savings for the user.

Likewise, the use of a generic base roll applicable to multiple different production runs may allow the manufacturing process to be performed with less setup, and may require the use of fewer plates for production and less tooling, all of which is both more efficient and desirable. The use of a generic base roll applicable to multiple different production runs may also require less inventory to be kept on hand, as the generic base roll may be usable for any type of label stack. Therefore, it may no longer be necessary to purchase and store many different base rolls for each different type of label stack that may need to be produced.

When a label stack is produced, it may be understood that, in some exemplary embodiments, the labels may be intended to be separated, for example, if the labels contain separate care instructions or other instructions provided in different languages and it is desired to expose just one label having just one language based on the destination country of the article to which the label has been affixed. As such, it may be desired to facilitate the severability of these labels by making it easier for a user to remove any unnecessary or undesirable labels from the label stack without disturbing the remaining labels in the label stack. For example, according to an exemplary embodiment of the present invention, a label may be provided having a tab coupled to the side of the label, which may be graspable by a user and may allow for the removal of a label layer or a label stack by peeling the label layer from the label stack by the tab. The label tabs may additionally be provided with distinguishing information, such as a country name, country code, or country flag, which may indicate that the label tab corresponds to instructions provided in a particular language or otherwise be intended to be exposed when the product is sold into a particular country or locality. For example, a country, state, or province may have different requirements for warning labels, and it may be preferable to combine them in a label stack, thereby resulting in variable label layers having the different warning label information and provided in the same language. The tabs are typically not provided with adhesive so that they can be easily grasped and separated from the stack. In addition, the tabs extend outwardly from the edge of each of the label plies and label stack so that they are clearly differentiable from the label stack.

In an exemplary embodiment, tabs may be provided such that they do not cover one another when stacked on top of one another when the label stack is manufactured, or such that the tabs are at least visibly staggered. For example, where there are eight countries or localities having their own label layers, and wherein there is only room along a top row for four tabs to be provided side-to-side, the tabs may be disposed so that the tabs are arranged in two rows of four stacked on top of one another, with the fifth tab corresponding to a fifth layer stacked under the fourth layer and being disposed at the same location along the length of the label layer as the first tab, and so on and so forth. In other exemplary embodiments, it may be desirable to dispose the tabs in positions other than along one edge of the label (for example, along two or three different sides of the label or even all four sides of the label) or it may be desirable to provide the tabs at variable length or in variable shapes or styles (such as different colors or textures) such that the tabs can be readily distinguished from one another, such as may be desired.

In a further exemplary embodiment, a tab pattern may be established for a sequence of tabs and the tab pattern may be replicated for identical sequences of tabs. This embodiment would allow a customer or other user to easily determine which layer a particular label that they want to retrieve (for example, a label with their particular language, or with other content that they desired to retrieve) has been located on. This may save the customer or user from having to go through all the layers in order to find the correct language, or may allow a customer that intends to sell the product in multiple jurisdictions (for example, a multinational department store) to provide the set of labels for their customers to choose and remove such as may be appropriate.

In an exemplary embodiment, it may be desirable to further save space or further prepare labels in a label stack by preparing material on either side of a label layer. The labels organized in such a manner may be arranged so that the labels in the stack may not be completely removable from each other and may be permanently affixed to one another along one edge, if desired, which may allow the label layers to be peeled apart from one another (except along the edge by which they are bound) and read like a book, if such is desired. In another exemplary embodiment, label layers in the label stack may be fully removable and the content printed on the adhesive side of a base layer may be intended to be read after removing. For example, such a label layer may have content related to initial care instructions for an article, such as initial wash instructions for an article of clothing, while the exposed label layer may have content that relates to later care instructions for the article.

According to an exemplary embodiment, a process for making use of both sides of a section of label material may be as follows. First, a label strip may be prepared using appropriate material as per an exemplary embodiment of a manufacturing process; for example, a label strip may be prepared using pressure sensitive adhesive (PSA) synthetic material. In a next step, the liner may be delaminated in order to expose the pressure sensitive adhesive on the liner-facing side of the label strip. In a next step, UV deadener may be selectively applied to the label strip in order to pattern kill select portions of the PSA. In a next step, varnish, such as water-based thermal transfer varnish (WB TT varnish) may be applied to the label strip in the same area as the UV deadened area. In a next step, the label strip may then be re-laminated, and the web may be turned in order to reorient the liner and the placement of the label strip, if so desired.

In a further step, release varnish may be pattern printed onto the face material of each label in order to ensure that the label layers can be readily removed from one another when arranged in a stack. The label strip may then be die cut into a label shape. In a next step, the back of the liner may be opened by a reverse cut or back slit, which may expose the underside of each label that had previously been laminated to the liner. The web may then be sent to a printer; for example, the web may be rewound and sent to the same front-and-back printer that had initially been used in order to print material on the outward-facing section of the labels.

In a further step, the web having the labels may then be processed through a tamping process in order to produce the labels in a final form. In an exemplary embodiment, this may entail, for example, removing the liner on entry of the web to a tamp process, applying additional pressure-sensitive adhesive through a hot melt process, and adding an additional liner. The PSA-coated side of the label may then be touched (tamped) to this additional liner in order to process the web.

Other arrangements or other variations of this or other process steps may be understood, as may be desired. For example, in an exemplary embodiment, it may be desirable to add additional adhesive, or laminate the labels, to a new liner before the old liner (having the reverse cut or back slit) is removed, and/or the labels may be tamped to the new liner and the strips of the old liner may be removed once the label is tamped. For example, the strips of the old liner may be pulled away from the label configuration from each side once the center of each label is tamped to the new liner. The pre-printed labels may then be tamped as necessary.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
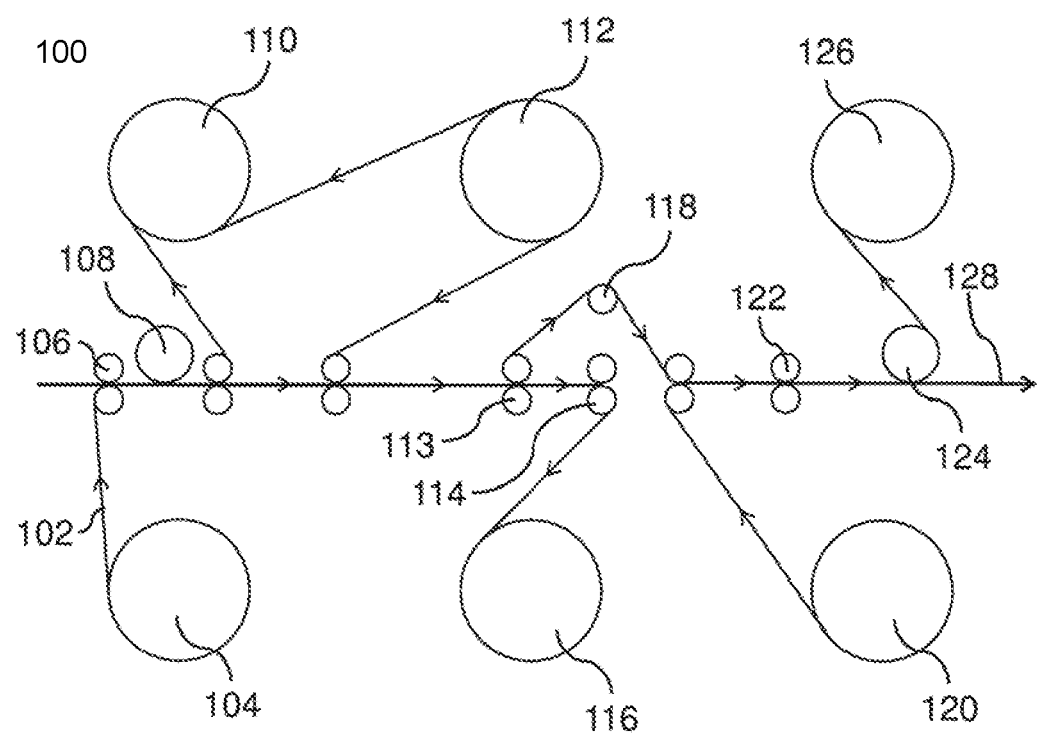
FIG. 1 illustrates a prior art process and web diagram presenting an exemplary embodiment of a manufacturing method for producing a label assembly.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a multiple part peel and reseal label stack assembly that may comprise one or more RFID devices, a base roll assembly for producing the label stack assembly, and a method for generating the same. In some exemplary embodiments, the label stack assembly may include a scalable number of layers capable of opening and closing. The opening and closing capabilities may be neutral or near neutral in resistance and may be capable of repeated openings without losing the peel and reseal properties. Preferably, the layers of the label construction and the peel and reseal aspects thereof should perform for approximately ten openings and closings or resealing's. Certain exemplary embodiments of the method and apparatus may be configured to operate according to one or more prior art methods or to produce one or more articles understood in the prior art, as well as being configured to operate according to one or more other methods to produce one or more other articles, such as may be desired.

Referring initially to the drawings, FIG. 1 illustrates a prior art peel and reseal label base roll producing apparatus 100. More specifically, transfer tape 102 may be in-fed from a first in-feed position 104. Transfer tape 102 may optionally have an adhesive layer disposed on its surface. The adhesive layer may, for example, be a permanent pressure sensitive adhesive (PSA). One exemplary permanent pressure sensitive adhesive may be S490, available from Avery Dennison Corporation of Pasadena, California. However, other adhesives may also be used, as would be understood by a person having ordinary skill in the art. The dimensions of transfer tape 102 may vary, as desired, and may be dependent on individual apparatus 100 attributes and capabilities. In some exemplary embodiments, transfer tape 102 may have a width of approximately 166 mm, though other widths are also contemplated. The transfer tape 102 web coming from the infeed position may optionally be pre-printed with desired content. Transfer tape 102 may be progressed through an edge guide roll 106 to a first die station 108. At first die station 108, a top liner of a liner 110, such as a release liner, of transfer tape 102 may be cut or slit, revealing an adhesive layer. In an exemplary embodiment, a release liner may be a silicone-coated liner or other suitable liner, as would be understood by a person having ordinary skill in the art. An engraved fixed kiss cutting die cutter or slitting tool may be utilized to perform the cut or slit at die station 108. A pattern formed by the cut or slit at die station 108 may be conformed to any desired permanent adhesive specifications.

In some exemplary embodiments, the permanent adhesive may create a permanent or substantially permanent adhesive stripe that may run along an edge of a label, for example, in a machine direction. When a label assembly is formed, the adhesive stripe may allow multiple layers of labels to be secured together along an edge of the labels. In an exemplary embodiment, a base label layer of a label assembly may have adhesive covering all or substantially all of a surface area for attaching to an article. This may facilitate permanently adhering the label assembly to an article. Alternatively, the base layer of the label assembly may be provided with a removable adhesive to allow for easy removal of the label or a frangible adhesive such that upon separation from the article to which it is attached, the label assembly may not be reattached and the coated area may no longer be tacky to the touch.

As used herein, the term "machine direction" may refer to the direction of web travel through the machine from the unwinding of the beginning material to the collection of the web(s). For example, there may be four adhesive stripes across a web, or any other number, as desired depending on the final configuration of the product to be assembled or capability of the machine manufacturing the product. Additionally, in some exemplary embodiments, one or more of the permanent adhesive stripe or stripes may act as a spine of a peel and reseal label, similar to a spine of a book, magazine or the like.

Still referring to prior art FIG. 1, after the top liner is slit, the liner 110 as well as any matrix material may be removed and rewound, for example, as waste or may be collected for recycling. The removal of the liner 110 may uncover and reveal the adhesive stripes, as described above, in a face-up fashion. In some exemplary embodiments, the adhesive stripes may be approximately 5 mm in width, though other widths are also contemplated.

A removable paper stock 112 may be peeled off the liner 110 and rewound. In an exemplary embodiment, the removable paper stock 112 may be, for example, a low tack ultra-removable paper stock. Further, it may be noted that the web width may be any other desired dimension. In an exemplary embodiment, the web width may be, for example, approximately 160 mm. Then the transfer tape 102 may be over laminated, such that an exposed adhesive side of the removable paper stock 112 covers the transfer tape 102 with the exposed permanent adhesive stripes.

Further, and still referring to prior art FIG. 1, the web may be progressed with rollers 113 to a nip point 114. After the nip point 114, any remaining transfer tape liners 116 may be peeled off, for example from the bottom, and may then be rewound and collected for recycling. Both liners 110 and 116 may be removed at this time. Additionally, as the paper stock 110 may utilize an ultra-removable adhesive, the liners 110 and 116 may release in a desired fashion from the paper stock face material.

After the liners 116 from the bottom of the assembly 100 have been peeled away, the web may be taken over a roller 118, for example a plasma or other non-stick coated roller, and may subsequently be laminated onto a new liner 120. The new liner 120 may be fed in from a second in-feed position (not shown). In some exemplary embodiments, the new liner 120 utilized herein may be a waste product recovered from other formation processes or may be virgin material.

Next, in a further exemplary embodiment, the web may be progressed through a second nip roll 122. The web may further be progressed to a die cutting or other cutting or slitting unit 124, where the process of die cutting or slitting the web may take place. After die cutting, a matrix waste 126 may be removed and the desired label web 128 may be formed and collected. As such, it may not be necessary to utilize machine direction register for the exemplary embodiments described herein. Instead, a cross register may be utilized to allow for the permanent adhesive to be positioned on, for example, a downward, left side of a die cut label to potentially form the spine or edge of the label construction. The web may then be slit or cut into two labels, up formatted, and then rewound using a re-winder, for example a turret re-winder.

Figure 1A:
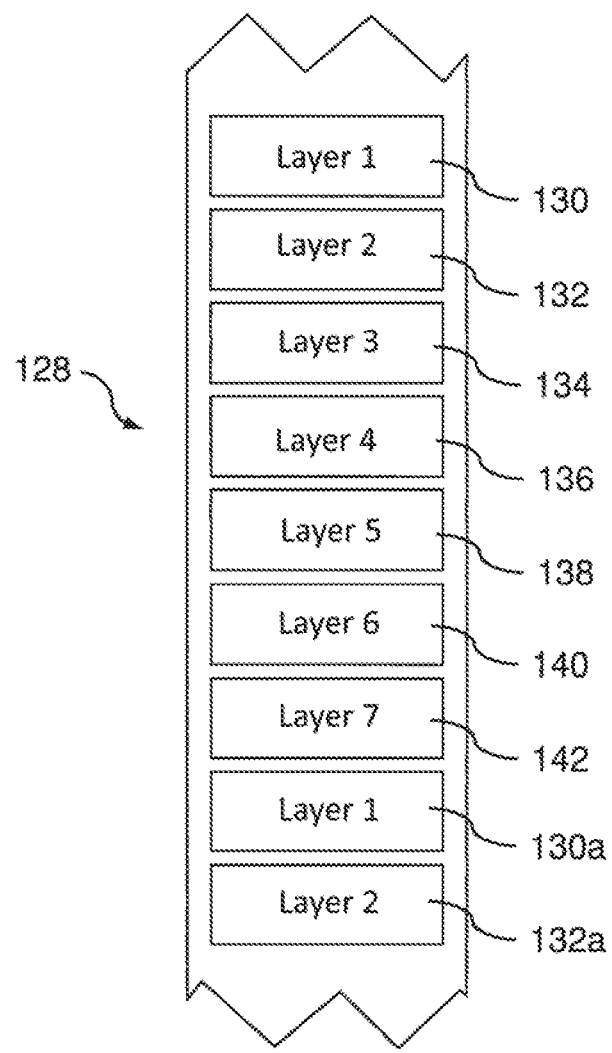
FIG. 1a illustrates a prior art embodiment of a web assembly such as may be created by the manufacturing method of FIG. 1.

Now referring to prior art FIG. 1a, the desired label web 128 may be provided after completion of the die cutting of the manufacturing process performed in accordance with the description of prior art FIG. 1. The web 128 may comprise a number of separate label layers 130, 132, 134, 136, 138, 140, 142, 130a, 132a. A configuration of the web 128 shown in FIG. 1a may, for example, provide for a seven-layer label assembly, although this is not meant as a limitation as more or less layers may be used to suit user need or preference. The layers 130-142 may repeat on the web 128 in accordance with a desired number of assemblies for a production run. Each of the layers 130-142 may have decreasing corner radii in at least one corner, as further described below and shown in prior art FIGS. 2-2b. The decreasing corner radii of each layer may facilitate separating, or peeling back, the layers 130-142 from successive layers in the label assembly. The sheets or layers 130-142 may also be provided with an adhesive pattern, as described above, to facilitate the sheets being formed into a stack to create the label web assembly 128. In some exemplary embodiments, the sheets or layers 130-142 may be layered using a post finishing label applicator.

The fixed and/or variable information to be presented on the label web assembly 128 may be printed onto the individual layers 130-142 when in a base roll form. Once printed, the individual layers 130-142 or sheets may be collected on a vacuum tamp/suction pad and readied for further processing.

Figure 1B:
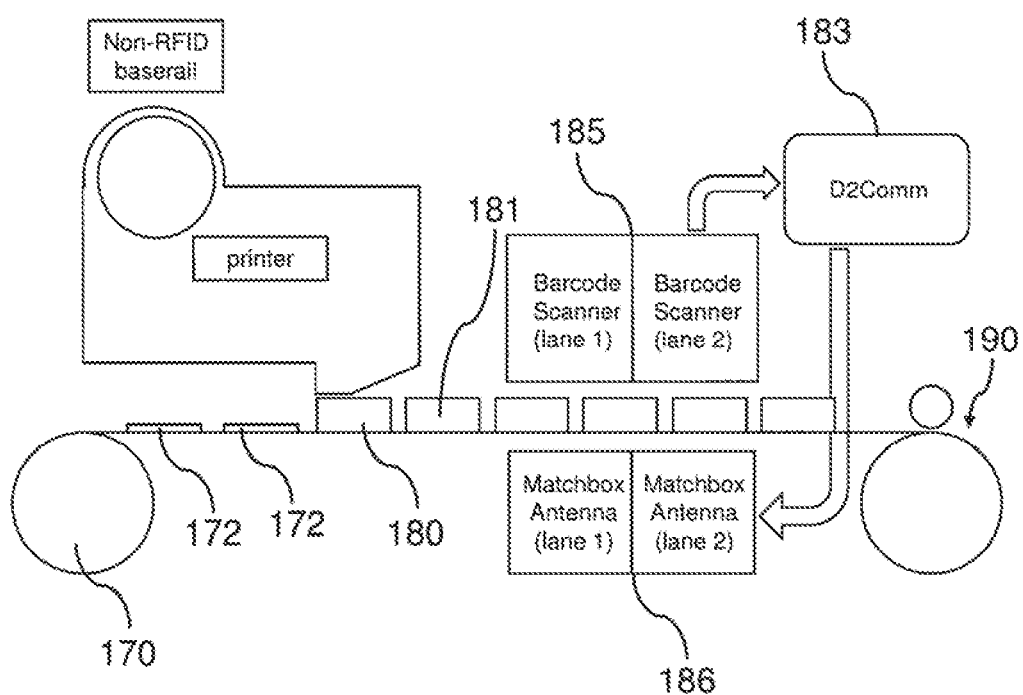
FIG. 1b illustrates a schematic of a prior art embodiment of an assembly of the label assembly with RFID devices.

Now referring to FIG. 1b, a plurality of RFID devices 172 may be added to a label assembly 181. In an exemplary embodiment, the RFID devices 172 may be "wet inlays," which include a pressure sensitive coating on the inlay such that it can be readily adhered to a surface. The RFID devices 172 or wet inlays may be provided on a first web 170. The RFID devices 172 may be advanced in a machine direction, and may be tested before proceeding to a tamp assembly point 180. At the tamp assembly point 180, a first layer of the label assembly 181 may be placed over an RFID device 172 and the process may be repeated or alternatively the other layers of the desired label assembly 181 may be overlaid onto the first layer.

After completion of the label assembly 181, the label assembly 181 including one or more RFID devices 172 may be moved to a station for verification that the RFID device 172 is working, and for encoding of the RFID device 172.

The RFID devices 172 on the web may be tested by a reader/scanner 185 and an antenna assembly 186 to determine if the RFID devices 172 are functioning and/or communicating properly. In an exemplary embodiment, reader/scanner 185 may be a barcode scanner or other suitable device for testing the RFID devices 172.

Once an RFID device 172 is determined to be operational, information may be encoded to the RFID device 172, and such information may be stored on and transmitted from a database 183. If defective RFID devices 172 are detected on the web, the areas containing the defective RFID devices 172 may be marked and can be removed from the web and discarded so that they do not become part of a finished label assembly 181. The database may retain an additional amount of encoding information so that it can replace defective RFID devices or assemblies that are removed from the web.

Next, after the web and the RFID devices 172 have been tested, the web may be slit/cut into the individual label assemblies 181 and collected at 190. From this point, the roll or web of collected labels 181 may be transported to a manufacturing location, and the label assemblies 181 may subsequently be adhered to desired articles, such as consumer goods.

Figure 2:
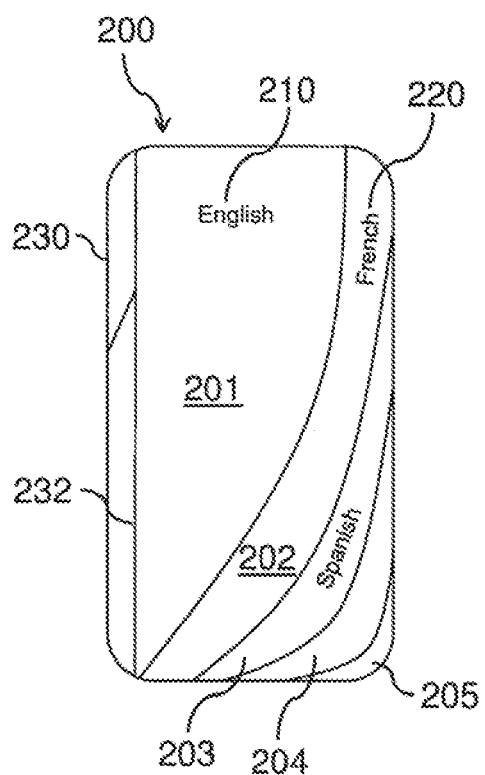
FIG. 2 illustrates a prior art embodiment of a label assembly.

Referring now to FIG. 2, a peel and reseal label assembly 200 is shown. The label assembly 200 may comprise multiple plies 201-204. In an exemplary embodiment, the label assembly 200 may include plies 201, 202, 203 and 204, each of which may be of the same dimensions as the other plies or alternatively may have different dimensions based on the particular requirements of the end user application. In addition, the sheets, layers or plies 201-204 may have one or more corners with decreasing radii as will be described herein.

Each ply 201-204 of the label assembly 200 may also be provided with indicia or printed material. The indicia may optionally be fixed and/or variable indicia. Each ply 201, 202, 203, 204 of the label assembly 200 may, for example, include the same information written in different languages such as, but not limited to, English 210, French 220, and otherwise, as would be understood by a person having ordinary skill in the art. Exemplary information may include care information for a garment, flammability or fire details, ingredients for a consumer food product, directions of use for a consumer good, product warnings or instructions, compliance or sustainability information or any other information desired to be included on a label assembly.

The sheets or plies 201-204 may further be supported by a back panel 205, which may also have information printed thereon. In an exemplary embodiment, the label assembly 200 may be bound along a side edge 230, such as through the use of adhesive which may keep the entire label assembly 200 structure together. It should be understood that while the assembly 200 is shown as being bound along the side edge 230, it may alternatively be bound along a top or bottom edge or a combination of edges. If multiple sides are joined together, the label assembly 200 may be provided with a fold line 232 or alternatively, a tear opening feature to remove a marginal edge and allow the assembly to be opened or the individual sheets or plies 201-204 to be separated from the stack. Alternatively, a base/back ply or sheet may optionally be a wet RFID inlay to support the stack.

Still referring to FIG. 2, a label assembly 200 may have any number of layers, for example, between two and seven separate layers of the assembly. Nonetheless, the label assembly 200 should not exceed a size, thickness, or otherwise have properties that would prevent processing through label printers and applicators that might be present in a manufacturing location. That is, the thickness of the assembly should be less than the maximum thickness of a label stock material to pass through a nip in a printer, such as between the feed mechanism and the print head of a printer so as not to cause jams in the system.

Figure 2A:
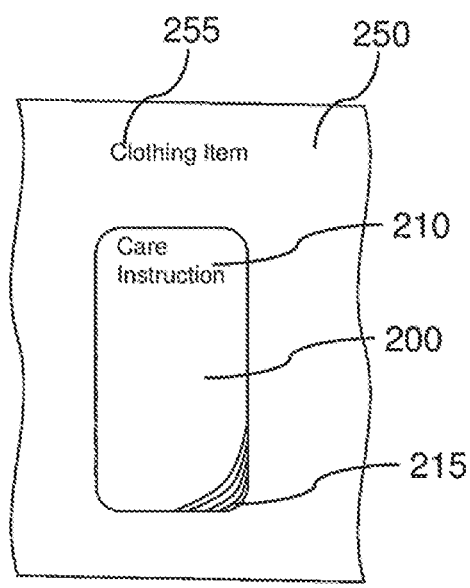
FIG. 2a illustrates a prior art embodiment of a label assembly attached to a consumer good.

Now referring to FIG. 2A, a label assembly 200 may be attached to a consumer good 250, such as an item of apparel, garment or accessory therefor 255. In this example, the label assembly 200 may be present care instructions in the English language 210, those related to cleaning or storage of a garment or apparel item. A top ply or layer may, for example, be printed in the English language. Label assembly 200 may also include scalloping or reduced radii corners 215 of the label assembly, as described below in relation to FIG. 6. The label assembly may also include variably printed information such as serial numbers, lot numbers, bar codes or the like, which when used with RFID can be used to match the printed information to the encoding of the RFID device.

As mentioned previously, the printing or imaging that may be provided on the individual sheets or plies of a label assembly may optionally include static or fixed printing. Fixed printing does not change from sheet to sheet, such as may be the case with size information or care label symbols in connection with a garment or apparel item. In comparison, variable printing does change from sheet to sheet, such as may be necessary with printing information in different languages or printing different statutory or regulatory requirements that may appear in certain jurisdictions.

Figure 3:
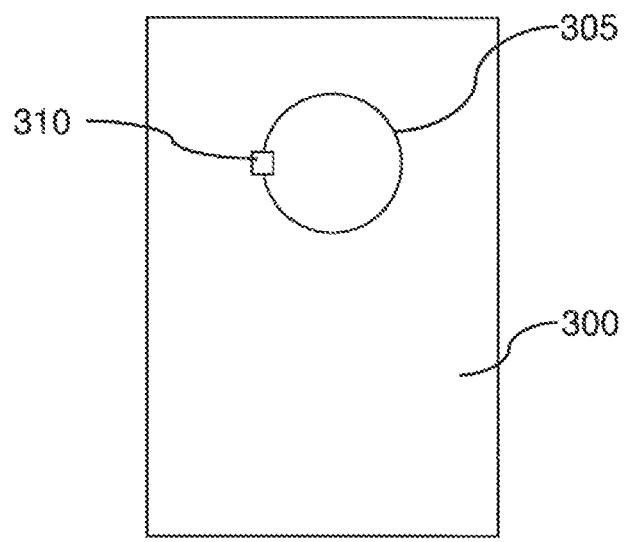
FIG. 3 illustrates a prior art embodiment of a layer of the label having a RFID device with an antenna.
Figure 4:
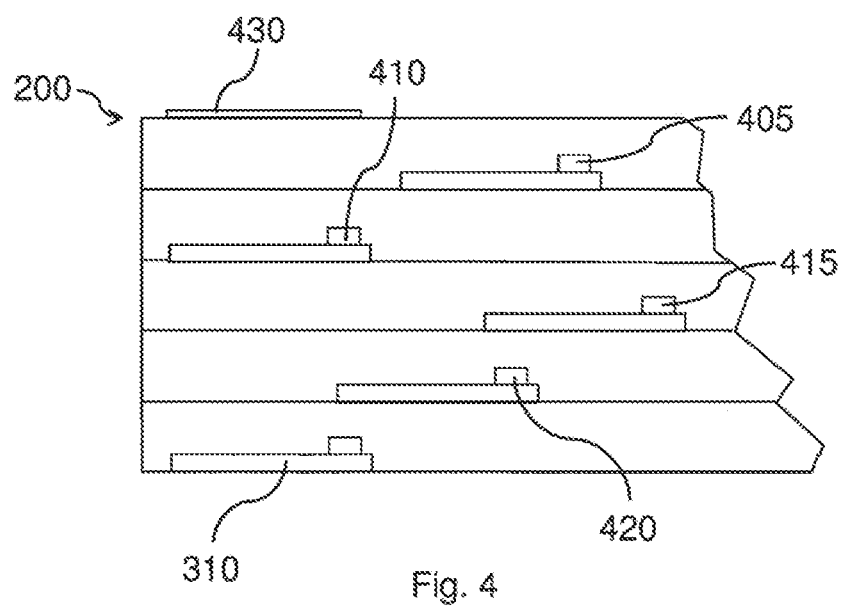
FIG. 4 illustrates a cross sectional view of a plurality of layers of a prior art label with each layer having a RFID device.

Referring now to FIGS. 3 and 4, a variety of antenna assemblies may be included in the label assemblies. For example, a far field antenna 305 may be included in the base layer 300 of a label structure and the far field antenna 305 may have a chip 310 with a first ID. A series of near field elements 405, 410, 415 and 420 in other layers of a label may couple to the central loop 310 of the first RFID device antenna in the base layer 300 of the label, thereby adding subsequent identities to the label stack. The near field elements 405, 410, 415 and 420 may be arranged to be substantially co-axial when the labels are stacked but may alternatively be splayed out of alignment, as shown in FIG. 4. The near field elements 405, 410, 415 and 420 and the far field antenna 305 may be arranged so that the tuning of the composite label stack is a desired frequency, e.g. in the UHF, HF, LF frequency ranges.

The label assembly 200 may also be printed with a scannable code 430 by which a user can read the code via a smart device and then download the information that is linked to the label assembly. In some exemplary embodiments, a scannable code 430 may be, for example, a barcode. By scanning a code, a user may download, for example, care instructions about a garment to the user's device. Other exemplary downloadable information may include, without limitation, product warnings, regulatory information, sustainability information and activity in connection with the manufacture of the item to which the label assembly 200 has been attached. In this example, if a label assembly 200 is attached to a garment one may be able to check on the labor conditions of the manufacturing facility where the garments were produced as well as the source of materials (e.g. fibers, dyes, etc.) that may make up the particular garment, as well as the packaging and trim products associated with the garment.

Figure 5:
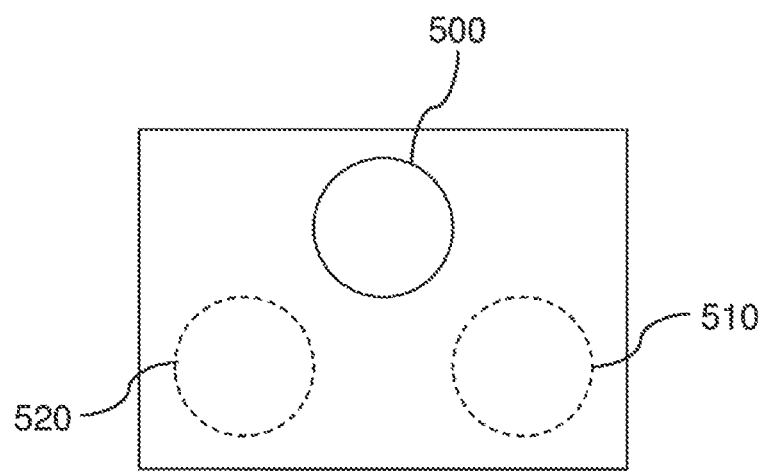
FIG. 5 illustrates an alternate arrangement of a far field antenna structure and near field antenna(s) in the other layers of a prior art label.

An alternative arrangement of a far field antenna structure 500 and near field antennas 510 and 520 in other layers of a label assembly are illustrated in FIG. 5. More specifically, the base layer of the label assembly may have a series of coupling positions where near field devices in other layers of the label assembly may be linked to form the composite identity far field device. As previously noted, the tuning and location of the positions related to the common antenna may be arranged to give a desired operating frequency for the label stack.

Figure 6:
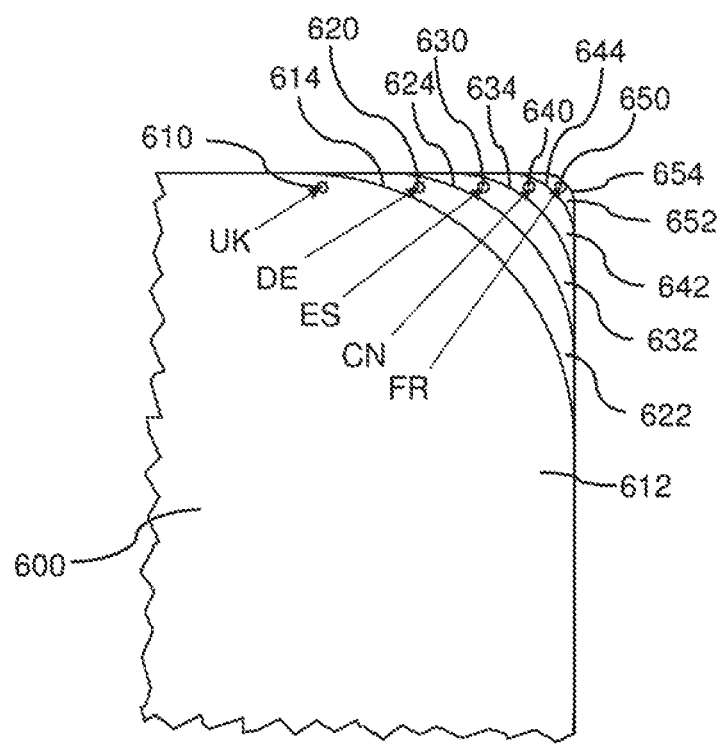
FIG. 6 illustrates a prior art label assembly having a plurality of layers.

Referring now to FIG. 6, a label assembly 600 may include a number of individual sheets, plies, or layers 612, 622, 632, 642 and 652. Individual sheets may include sheet indicators. In exemplary embodiments where individual sheets may have information presented in different languages, a language indicator 610, 620, 630, 640 and 650 may be provided on each sheet. For example, as shown in FIG. 6, different languages may be designated as English (UK) 610, German (DE) 620, Spanish (ES) 630, Chinese (CN) 640, and French (FR) 650. However, it may be understood by a person having ordinary skill in the art that sheet, or layer, indicators may be used for any desired print material displayed on the sheets, and is not limited to language indicators. Nonetheless, the use of the sheet indicators enable a user to quickly and easily select a desired sheet, and read the information that has been provided thereon.

FIG. 6 also illustrates an embodiment with a decreasing corner radius of each ply or sheet, 614, 624, 634, 644 and 654, which also enables a user to quickly and easily select a particular sheet or ply having the relevant language or instructions. The decreasing corner radius may optionally be provided on only one corner of the assembly, but in alternative embodiments the decreasing corner radius could be present on multiple corners of the label assembly. The amount that the corners decrease may generally be equal in size, but can also be varied in the label stack depending on the preferences of the end user or equipment capabilities.

In the exemplary embodiments described herein, base rolls may be ready for processing by a service bureau, and the service bureau may print as standard using a sequential format, incrementing each portion of the web from the base roll. For example, if it is desired to make a seven-page label, the method and system described herein may print all seven labels sequentially and class or collect the seven labels as one, or a single label. The seven sequential labels may be layered on top of each other using a post finishing label applicator, as is known in the art.

Further, in some exemplary embodiments, approximately one hundred layers may be applied per minute onto a wet inlay such as an RFID inlay. RFID inlays may be any RFID inlays as desired, such as, but not limited to, those RFID inlays available from Avery Dennison Corporation of Pasadena, California. In embodiments having wet inlays, the wet inlays may be any desired type, for example "AD38x" narrow edge leading inlays. These inlays may be on pitch in both cross and machine direction, for example approximately 60 mm in the machine direction and approximately 40 mm in the across direction, although it may be appreciated that any other dimensions may be utilized, as desired. Additionally, encoding of the RFID inlays may be performed at a layer/application, or in any other fashion, as desired. In an exemplary embodiment, steps may be performed in one-up, two-up or any desired fashion as may be feasible.

RFID inlays as used herein may include a substrate, e.g. paper or plastic (PET), on which an antenna may be formed from a conductive material such as aluminum and a chip may be connected to pre-defined leads of the antenna to form a connection. The chip may be connected via a strap or other frame assembly.

Printing of the web or label plies may include information that will also be encoded onto the chip of the RFID inlay. Such information might include product information, pricing, bar codes, manufacture dates, ship dates, freshness dates, product compliance or information or any other relevant information that the manufacture or retailer may desire to utilize.

Figure 7A:
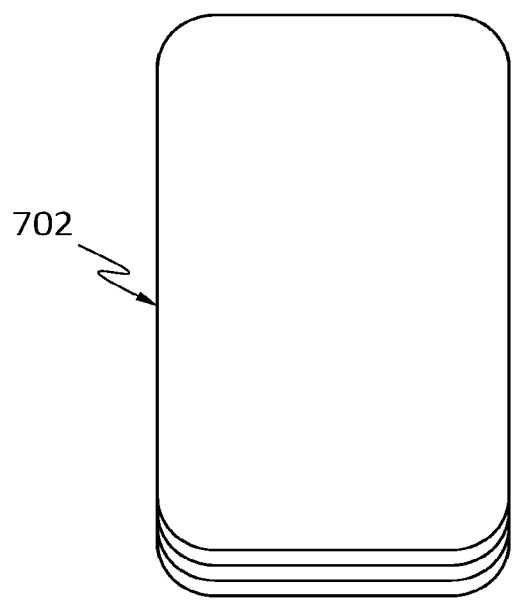
FIG. 7a illustrates a label having a plurality of layers in accordance with the disclosed architecture.

FIG. 7A illustrates an exemplary arrangement of a label stack 702. As pages or layers are added to the label stack 702, each successive page that is added should be smaller than the last page that had been added in order to allow each individual page in the set of pages to be removed from the label stack 702. This creates an ever-diminishing amount of space that is available for each successive page in the label stack 702. Often, a top page in the label stack 702 will be at least several lines shorter than a bottom page in the label stack 702, meaning that, in the most common case where the pages in the label stack 702 are translations of one another into different languages and all have the same content, the translated pages nearer to the top of the label stack 702 must be artificially shortened and content must be cut out.

Further, it is noted that in such a configuration, the customer or other user will not know which page contains the language (or other applicable page or other information) that is relevant to them. While it may be easy to determine the top page in a label stack 702, and may be easy to determine if the bottom page in the label stack 702 has the relevant content, for every other page, pages in the label stack must be removed individually so as to ensure that the page having the relevant language or relevant content is not accidentally removed and discarded.

Figure 8:
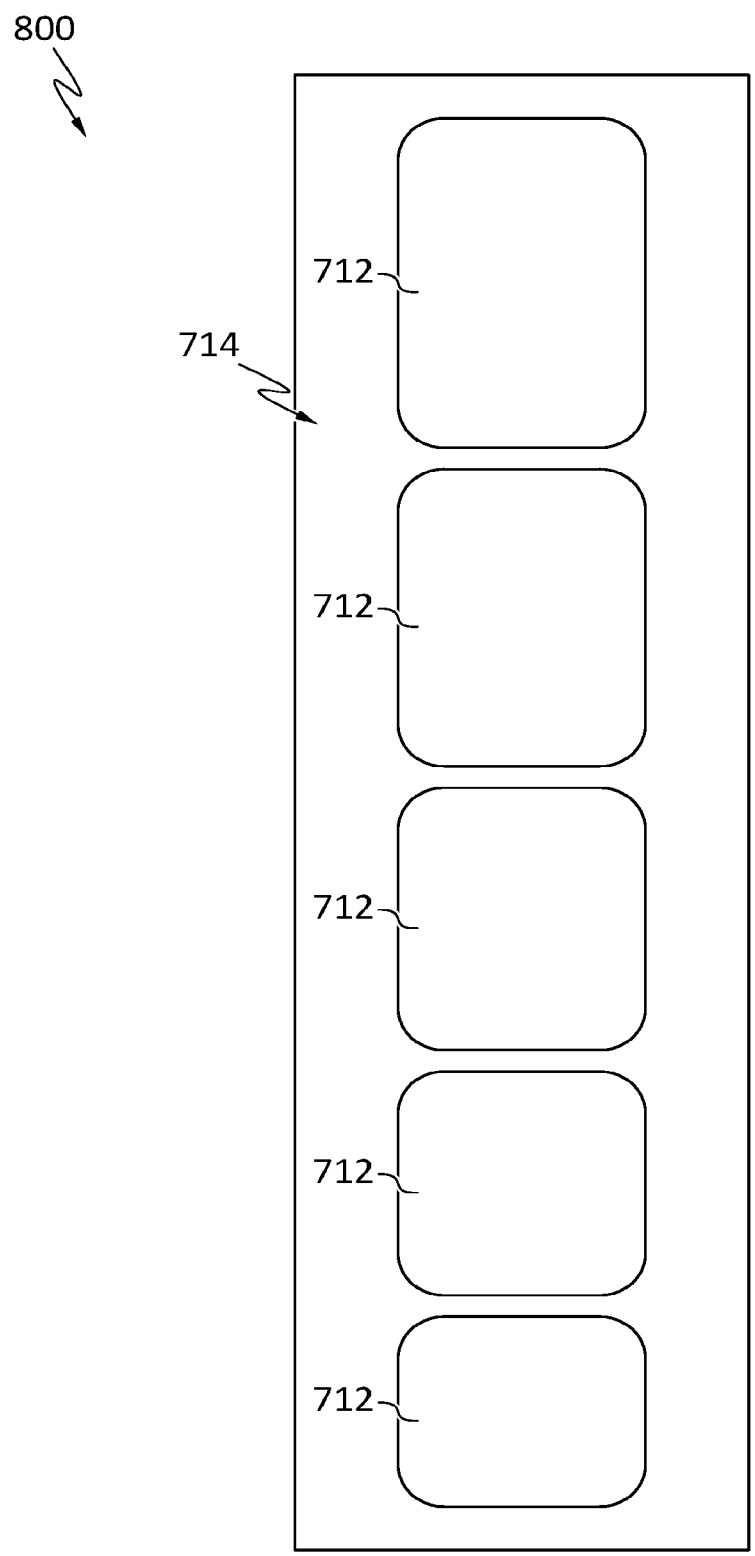
FIG. 8 illustrates a top down view of a prior art web upon which several labels are prepared.

It is also noted that the use of such a configuration requires each page in the label stack 702 to have a varying size, which is shown in more detail in FIG. 8. Each variant in the pages used requires a specific base roll to be used, thereby adding increased complexity to the supply chain and increasing storage needs, neither of which is desirable. For example, if a particular base roll configuration has a four-page set of labels having particular sizes, only the specific base roll created to work with that particular configuration will suffice, as only this base roll will have a repeating 1 by 4 pattern of labels with each label having the appropriate size and diminishing by the appropriate amount.

Figure 7B:
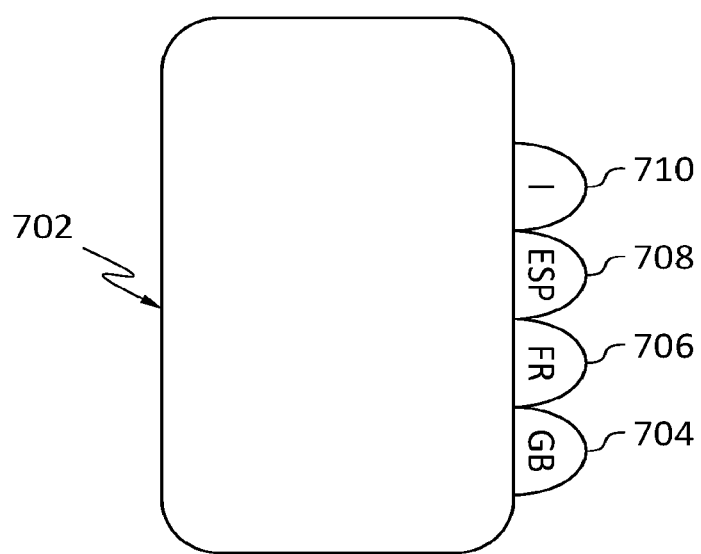
FIG. 7b illustrates a top view of a label stack assembly comprising a tabbed layer arrangement in accordance with the disclosed architecture.

As illustrated in FIGS. 7b and 7b, the present invention discloses a label stack assembly 702. The label stock assembly 702 comprises a base layer such as back panel 205 as discussed supra, and a plurality of pages 712 stacked on and at least partially attached to the base layer. The plurality of pages 712 may be at least partially peelable and resealable and may be configured to accept printed information. Additionally, each of the plurality of pages 712 is substantially identically dimensioned so as to not lose printable space. The label stock assembly 702 further comprises a plurality of tabs 704, 706, 708, and 710, which may be non-adhesive (or adhesive if desired) and may correspond to a plurality of languages or other particular types of content. Each of the plurality of tabs 704-710 are coupled or otherwise affixed to a corresponding one of the plurality of pages 712.

Additionally, the label stack assembly may further comprise an RFID device (not shown) as discussed supra in previous embodiments. The RFID device may be associated with or otherwise attached to the base layer or at least one of the plurality of pages 712. The RFID device may be a wet inlay, a far field antenna, a plurality of near field elements attachable to the plurality of pages 712, or combinations thereof as discussed supra.

According to an exemplary embodiment, each tab 704, 706, 708, 710 may be labeled with a short descriptor of the content provided on the page or the language used on the page. For example, the tabs 704-710 may be labeled with a country code for flag, such as a country code of "GB" or "US" (or a British or American flag) to indicate that the page is in English, a country code of "POR" or "BRZ" (or a Portuguese or Brazilian flag) to indicate that the page is in Portuguese, and so on and so forth. In an exemplary embodiment, country codes may correspond to the first few letters of the country's name in the language spoken in that country, for example, "ESP" for Spain 708. As is illustrated in FIG. 7c (which illustrates the label stack 702 with imperfect overlap between the pages 712 so as to show each page 712 from a top view), each tab 704, 706, 708, 710 may correspond to a particular page 712, which may allow a user to pull on the particular tab 704, 706, 708, 710 in order to separate the pages 712 that they do not wish to retain from the label stack 702.

Figure 7C:
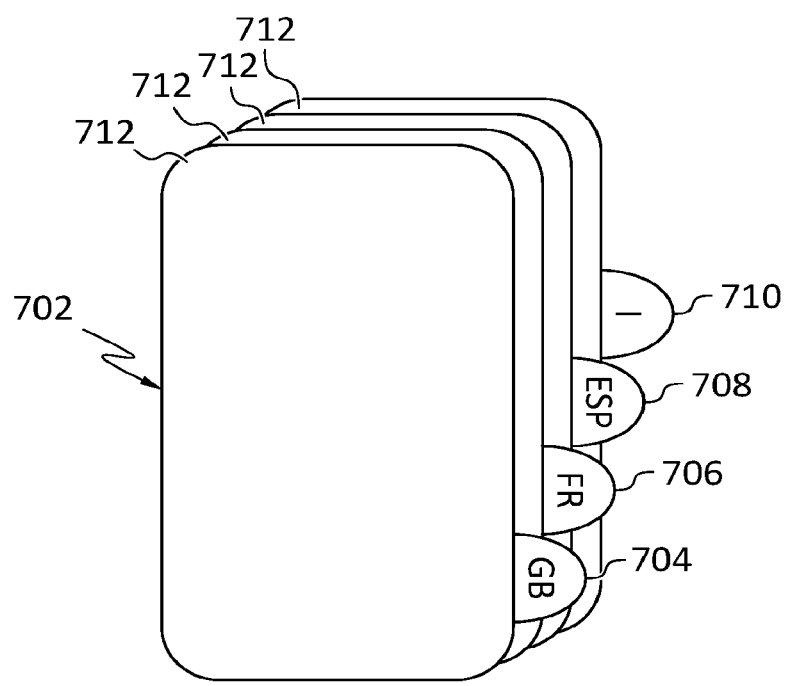
FIG. 7c illustrates a top perspective view of a label stack assembly comprising a tabbed layer arrangement in accordance with the disclosed architecture.

Additionally, as shown in FIG. 7c, the tabs 704, 706, 708, 710 may be arranged so that they do not cover each other (or do not cover successive tabs) when the individual pages 712 in the label stack assembly 702 are properly arranged so that each of the tabs 704-710 are visible when the label stack assembly 702 is assembled. For example, in an exemplary embodiment where there are four tabs, 704, 706, 708, 710, the first tab 704 (in this case corresponding to an English-language instruction and marked by the country code GB) may be arranged along one edge of its page 712 in a position near a corner of that edge; the second tab 706 (in this case corresponding to a French-language instruction and marked by the country code FR) may be arranged along one edge of its page 712 in a position nearer to the center of the edge; the third tab 708 (in this case corresponding to a Spanish-language instruction and marked by the country code ESP) may be arranged along one edge of its page in a position at the approximate center of the edge; and the fourth tab 710 (in this case corresponding to an Italian-language instruction and marked by the country code I) may be arranged along one edge of its page on the other side of the center of the edge, leaving room for at least one additional tab to be arranged next to the other corner of the edge of its page 712. This may ensure that each of the tabs 704-710, including the GB tab 704, the FR tab 706, the ESP tab 708, and the I tab 710 are each visible when the pages 712 are arranged in a stack, as well as potentially at least one additional tab (such as a tab for a German, Russian, Polish, Dutch, or other such translation) based on the intended destination of the product in question.

In an exemplary embodiment, arrangements of tabs greater than four (or five) may be arranged on the set of pages 712 arranged in the label stack 702. For example, the tabs 704-710 may be disposed on multiple different edges of their respective pages 712, such as two, three, or even four different edges of the page 712. As illustrated in FIGS. 7b and 7c, the GB tab 704 corresponding to the English-language translation may instead be disposed on a short edge of the page 712, which is separated from its position as shown in FIGS. 7b and 7c by a corner, and likewise the I tab 710 corresponding to the Italian language translation may instead be disposed on a short edge of the page 712 around the corner from its current position. Alternatively, other tabs may be added in such positions, as may be desired to suit user need and/or preference. Alternatively, tabs may be provided so that they are disposed in alternating positions. For example, the first tab 704 may be disposed in a first position on the first page 712, the second tab 706 may be disposed in a second position on the second page 712 under the first page 712, the third tab 708 may be disposed in the first position on the third page 712 under the second page 712, and the fourth tab 710 may be disposed in the second position on the fourth page 712 under the third page 712. This pattern, or any other pattern, may then repeat indefinitely as may be desired. For example, a pattern may restart with the first tab 704 in a first position on a fifth page 712 after the fourth page 712. In an exemplary embodiment, a tab pattern may be repeated even if the pattern does not feature any tabs in identical positions. For example, the first tab 704 may be in a first position, the second tab 706 may be in a second position, the third tab 708 may be in a third position, the fourth tab 710 may be in a fourth position, and after that the first tab 704 may be provided again in the first position, such as may be desired.

In other exemplary embodiments, the tabs 704-710 may have varying shapes, sizes, styles, or colors in order to enable the tabs 704-710 to be more readily distinguished from one another. For example, the tabs 704-710 may have a colored national flag instead of or in addition to a country code, or may have a different shape in order to identify particular content (which may be, for example, any fixed or variable content, including translations where appropriate). In another exemplary embodiment, the tabs 704-710 may be of different sizes and/or shapes in order to ensure that later tabs stick out past former tabs, ensuring that they can be more easily distinguished and selected.

FIG. 8 shows an exemplary embodiment of a base roll configuration 800 such as the type that may be used to produce the label stack assembly 702 shown in FIG. 7a. The base roll configuration 800 may be provided with a page set of label pages 712, which may be disposed on a liner 714. The plurality of label pages 712 may comprise a specific pattern, which in this case may be, for example, a 1×5 pattern. This pattern may repeat after a certain number of the label pages 712 have been produced, in this case five label pages 712. As shown in FIG. 7a, each label page 712 may be made successively smaller than the previous label page 712 until the pattern restarts. For example, the first label page 712 may have a first size; the second label page 712 may have a second size that is smaller than the first size, and so on and so forth until the termination of the pattern. As discussed with respect to FIG. 7a, this approach may be required in order to ensure that the label pages 712 can be separated from one another, but may result in a significant loss of content space on the smaller label pages 712.

Figure 9A:
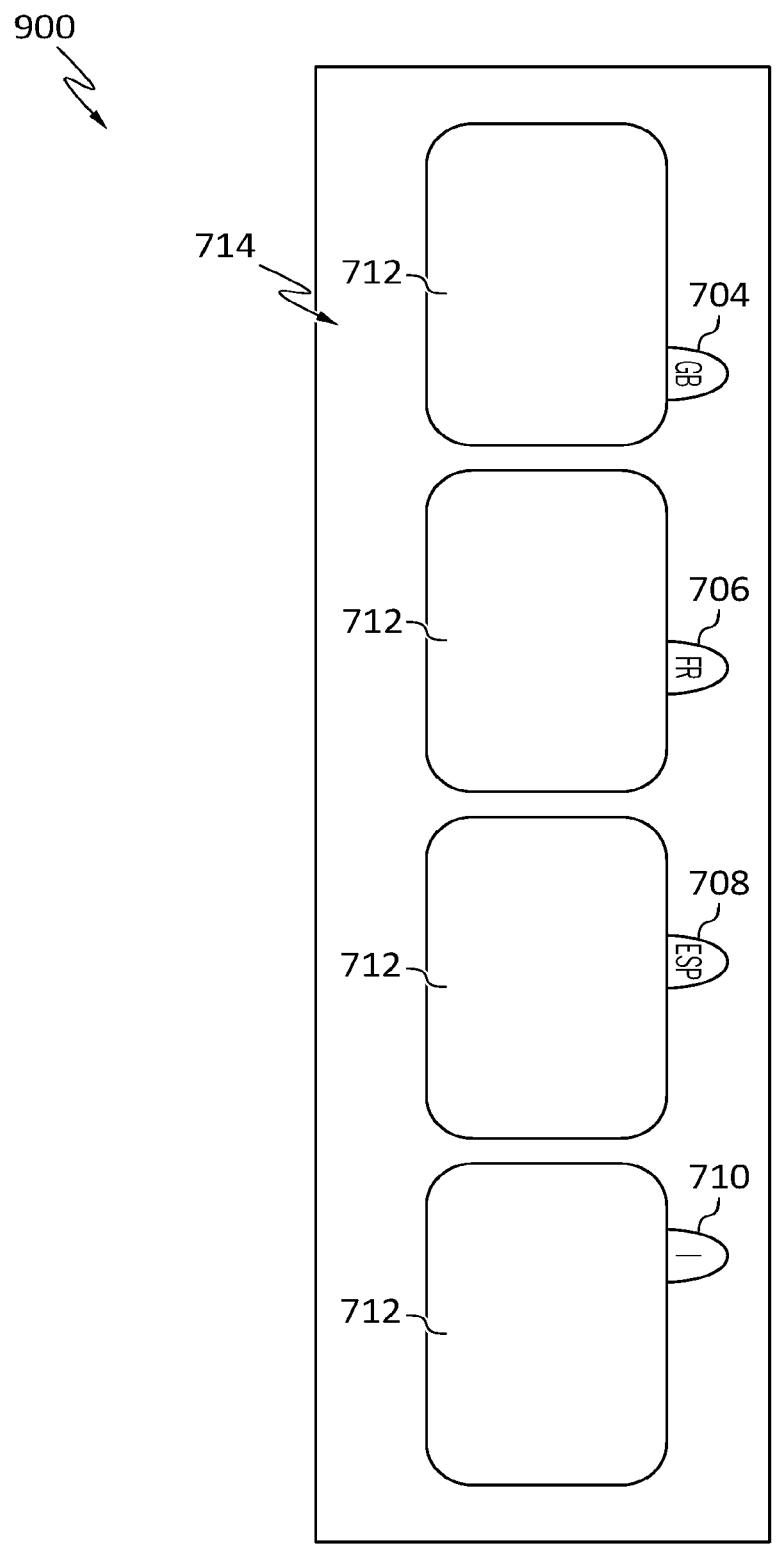
FIG. 9a illustrates a top down view of a base roll configuration upon which a plurality of labels are prepared in accordance with the disclosed architecture.

FIG. 9a illustrates an exemplary embodiment of a base roll configuration 900 such as the type that may be used to produce the label stack assembly 702 shown in FIGS. 7b and 7c. The base roll configuration 900 may comprise a page set of label pages 712, which may be disposed on a liner 714. The page set of label pages comprises a plurality of label pages 712. The plurality of label pages 712 may be configured to accept printed information. The base roll configuration 900 further comprises a plurality of tabs 704-710, and the number of tabs can be varied to suit user need or preference. The plurality of label pages 712 may have the plurality of tabs 704-710 attached to them, as shown in FIG. 9a. For example, a first label page 712 may have a first tab 704 coupled to or integrally formed with the label page 712, which may correspond to, for example, a first translation language (in this case English); a second of the label pages 712 may have a second tab 706; a third of the label pages 712 may have a third tab 708; and a fourth of the label pages 712 may have a fourth tab 710. The tabs may be non-adhesive and may be aligned on the base roll configuration 900 such that, when assembled, the tabs 704-710 line up over one another, optionally with a small gap between them in order to facilitate viewing. Additionally, at least one of the plurality of label pages 714 may further comprise an RFID device (not shown) as discussed supra in previous embodiments.

Figure 9B:
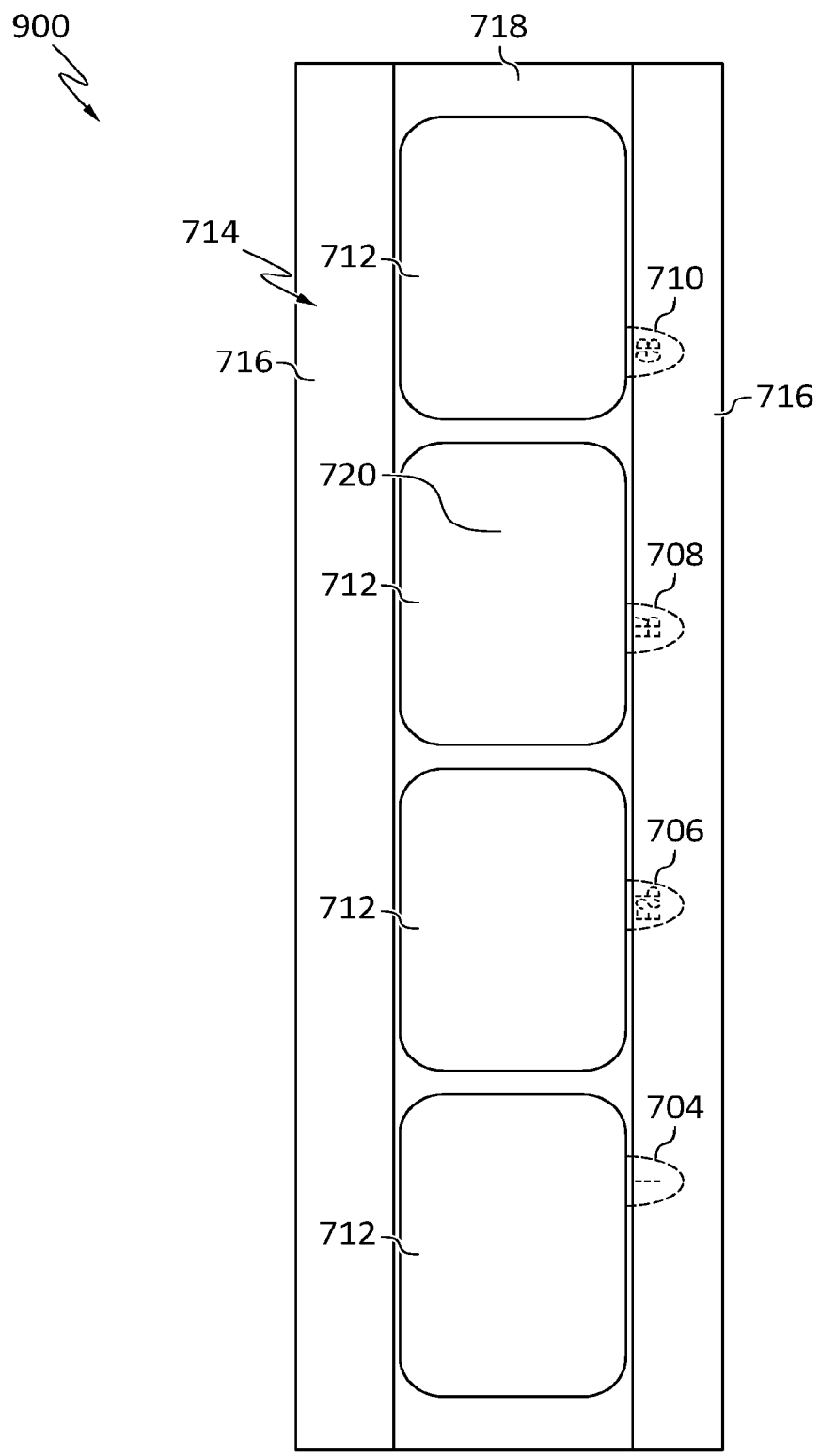
FIG. 9b illustrates an underneath view of the base roll configuration upon which the plurality of labels are prepared in accordance with the disclosed architecture.

FIG. 9b illustrates an exemplary embodiment of the base roll configuration 900, as seen from a reverse or under-web view. According to an exemplary embodiment, it may be desirable to make or include a slit in the liner material so as to allow the underside of the face material to be exposed, thereby allowing duplex printing to be performed on the base roll configuration 900. The liner 714 may comprise an edge portion 716 that is left in place and used to support the contents of the liner 714, such as the various label pages 712. The liner 714 may comprise a slit portion 718 that is opened in order to expose the underside of the face material of each label page 712 to duplex printing. The base roll configuration 900 or a similar base roll configuration also having a slit portion 718 may be any base roll configuration 900 that may be used to support a plurality of label pages 712, not just label pages 712 having tabs 704, 706, 708, 710. For example, according to an exemplary embodiment, the base roll configuration 900 may be a base roll configuration similar to that shown in FIG. 8, which may enable such base roll configuration 800 to be used for duplex printing.

Figure 10:
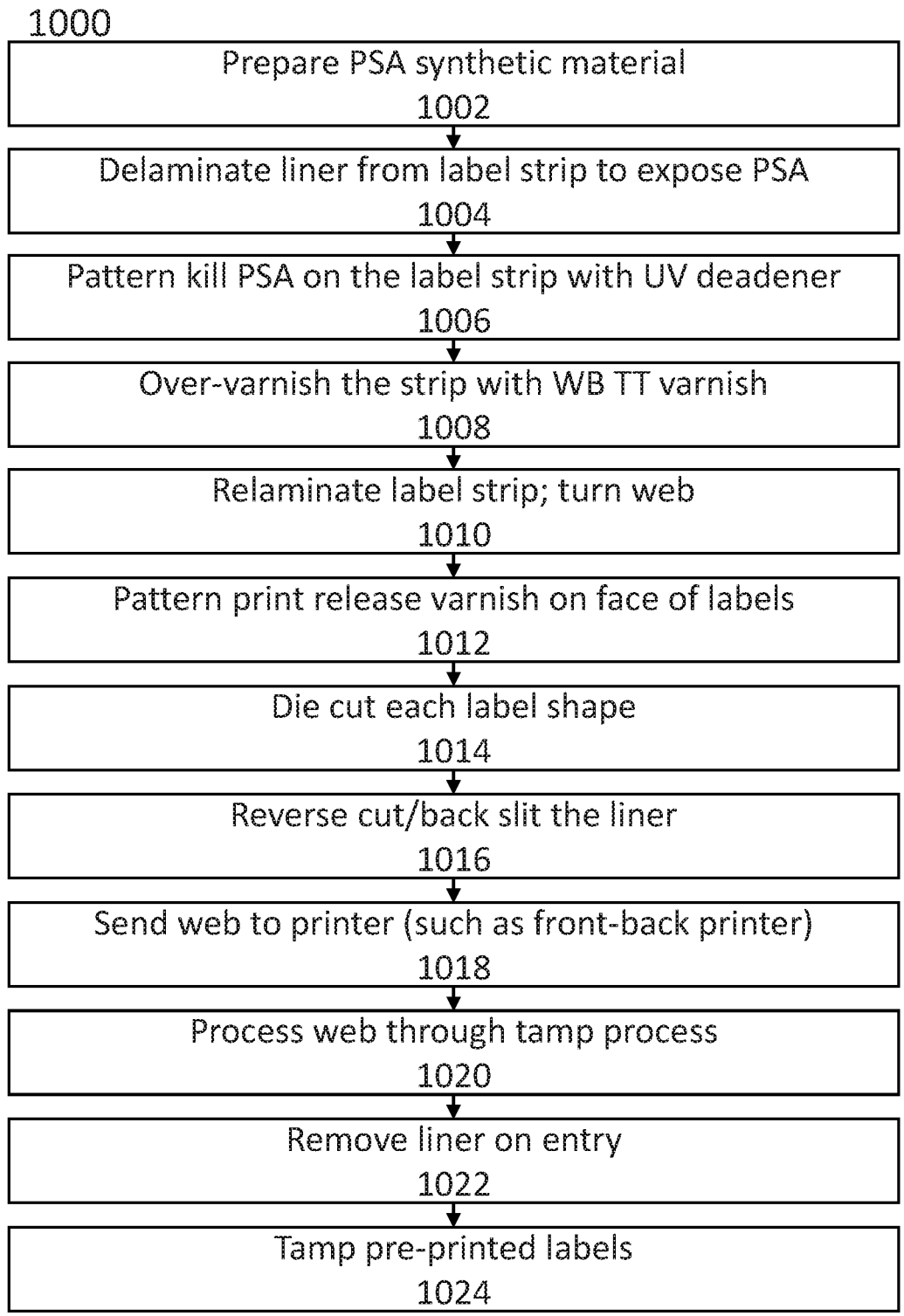
FIG. 10 illustrates a process flow diagram for a method for constructing a label stack assembly in accordance with the disclosed architecture.

According to an exemplary embodiment, the base roll configuration 900 such as may be described in FIGS. 9a and 9b, or another base roll configuration, may be used as part of a label preparation method 1000 such as that illustrated in FIG. 10. More specifically, FIG. 10 illustrates a label preparation method for constructing a label stack assembly as a process flow diagram for a process of preparing a set of two-sided label layers 1000 which may be used to produce label stacks as shown in the present application or other label stacks such as may be desired.

In a first step of a label preparation method 1002, a pressure-sensitive adhesive (PSA) material may be used as an initial workpiece. Such PSA synthetic material may be, for example, a strip of PSA-coated label material affixed via the PSA to a liner. At 1004, the PSA synthetic material may be delaminated from the liner, for example by peeling it off the liner or otherwise as may be desired. This may serve to expose the pressure-sensitive adhesive on the lower portion of the PSA synthetic material.

At 1006, a deadening coating may be applied to certain areas of the pressure-sensitive adhesive material. According to an exemplary embodiment, this adhesive deadener may be, for example, ultraviolet radiation-curable deadener (UV deadener), which may be pattern applied and laminated to a pressure sensitive adhesive-coated film or paper, thereby allowing for clean and easy separation of the layers. Further, at 1008, a varnish, such as a water-based thermal transfer varnish (WB TT varnish) or other such varnish, may be applied to the label strip in the same area as the deadened area of the pressure-sensitive adhesive. The varnish may have any other components (such as, for example, opaque optical whitener or other such material) if desired. It may then be possible to print onto the thermal transfer varnish once it has been applied. It should be noted that, if desired, another transfer material other than a water-based thermal transfer varnish may be used. For example, another thermal transfer varnish may be used, or another such aqueous coating such as a UV coating may be used, as may be desired.

At 1010, the label strip may be re-laminated onto a liner, for example once the varnish has been applied and has taken effect, such as may be desired. The roll or web of the label material may then be turned in order to expose the other side of the web, where the back of the liner may be located. At 1012, a release agent, such as a release varnish or other release coating, may be pattern printed onto the face material of the label strip. The release agent may be, for example, silicone, or any other release agent such as is known in the art. The application of the release agent onto the face material of the label strip may ensure that the label pages cut from the label strip can be successfully applied to one another to form a label stack without the label pages becoming permanently adhered to one another when this is not desired, and may ensure that the label pages can be easily separated from the label stack while minimizing the risk of tearing one of the label pages or otherwise introducing complications.

At 1014, the desired label shapes may be die cut from the label strip, in order to form finished labels from the strip of label material. According to an exemplary embodiment, the label shapes that are cut out from the label strip may or may not comprise tabs. Die cutting may be performed by, for example, the use of a solid or flexible die or the use of laser cutting, such as may be desired. Optionally, according to an exemplary embodiment, tabs may then be adhered to the label material, for example if it is desired to have tabs be separate from the label material in order to ensure that they can be more easily distinguished and selected by the user.

At step 1016, the reverse surface of the liner may be cut so as to make a reverse cut or back slit in the liner. The reverse cut may allow for printing to be performed on the liner side of the label rather than on the face sheet. According to another exemplary embodiment, it may be desired to perform this step at an earlier stage in the process. For example, a liner may be prepared initially having a reverse cut, if desired. Additionally, at least one of the plurality of label pages 714 may further comprise an RFID device (not shown) as discussed supra in previous embodiments.

At step 1018, the web may be sent to a printer. More specifically, the web may be rewound and sent to a front-back printer, such as the same printer that had been used to prepare front material. For example, an AVERY DENNISON SNAP 700 multiheaded multimedia printer may be used to print on the label material. According to such an exemplary embodiment, a SNAP 700 or comparable printer may be able to, for example, print on a range of materials including paper, pressure-sensitive adhesive, coated polyester, nylon, or satin weave polyester. In an exemplary embodiment, a SNAP 700 or comparable printer may be configured to encode and print one or more RFID tags in the label stack, or may be configured to encode and print one or more other types of electronic tags or electronic data transmission devices such as may be desired. In another exemplary embodiment, a different printer may be used, or a printer may be provided in a different position. For example, according to an exemplary embodiment, it may be desired to send the web material down the production line to be printed on by another printer rather than rewinding the web to use the same printer, if desired.

At step 1020, the web may be processed through a tamp process. For example, as part of a tamp process, the web may be fed in with the pressure-sensitive adhesive material exposed (through the reverse cut or back slit in the liner). As a part of the tamp process, the web may be hot melted with an additional liner so as to ensure that the additional liner is applied over top of the PSA material, thereby preventing it from becoming undesirably stuck to other material or to itself. This may result in a web formed from a fused liner having a plurality of label pages disposed thereon. Alternatively, a liner may be removed and replaced, or the label pages may otherwise be laminated to a liner and the old liner may be removed, such as may be desired.

At step 1022, once a set of labels and liner have been prepared as part of a web, it may be desirable to apply them to an article. According to an exemplary embodiment, the liner may be removed on entry of the article, at which point the pre-printed labels may be applied through a tamping process 1024. According to an exemplary embodiment, one or more finishing steps may be applied during or after the tamping process 1024. For example, according to an exemplary embodiment in which tabs are adhered to the label pages, it may be desirable to adhere the tabs to the label pages during this step. In another exemplary embodiment, in which it is desired to permanently affix the label pages to one another so as to allow the label stack to be read like a book, rather than allowing for the removal of individual label pages, a permanent adhesive or other binding method may be applied to the label pages during or after the tamping process 1024, as may be desired. According to an exemplary embodiment, such a process as described in FIG. 10 may allow for both the front and the back of each label page to be printed on, which may allow for the reduction of the number of label pages in a label stack.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A label stack assembly comprising:
    a base layer;
    a plurality of pages stacked on the base layer, each of the plurality of pages comprising a label material having a pressure-sensitive adhesive coating on a first face and a release agent on a second face;
    a plurality of tabs, wherein at least one tab is coupled to at least one of the plurality of pages, and each of said plurality of tabs extending outwardly from an end edge of the plurality of pages;
    where the plurality of tabs are non-adhesive,
    where the label stack assembly comprises at least one RFID device,
    where each of the plurality of pages further comprises a deadening coating applied to a portion of each of the plurality of pages forming a respective deadened area;
    where the deadening coating comprises an ultraviolet radiation-curable deadener, and
    wherein the plurality of pages are bound along an edge, and
    wherein each of the plurality of the pages further comprises a thermal transfer varnish applied only to the portion of each of the plurality of pages forming the respective deadened area.

2. The label stack assembly of claim 1, wherein the plurality of pages is at least partially peelable and resealable.

3. The label stack assembly of claim 1, wherein the base layer is attachable to an article.

4. The label stack assembly of claim 1, wherein the at least one RFID device is a wet inlay.

5. The label stack assembly of claim 1, wherein the at least one RFID device is a far field antenna.

6. The label stack assembly of claim 1, wherein at least a portion of each of the plurality of tabs is visible when the label stack assembly is assembled.

7. The label stack assembly of claim 1, wherein the plurality of pages are configured to accept printed information.

8. The label stack assembly of claim 1, wherein the plurality of pages are all of a same dimension.

9. The label stack assembly of claim 1, where the release agent comprises a release varnish or release coating.

10. The label stack assembly of claim 1, where the release agent comprises silicone.

11. The label stack assembly of claim 1, where the thermal transfer varnish comprises a water-based thermal transfer varnish.

12. The label stack assembly of claim 1, where the varnish comprises an opaque optical whitener.

13. The label stack assembly of claim 1, wherein each of the plurality of tabs includes a label comprising at least one of text and an image.

14. The label stack assembly of claim 1, wherein the plurality of pages are permanently bound along the edge.

15. The label stack assembly of claim 1, wherein the plurality of pages stacked are configured to be repeatedly peeled apart and resealed.

16. The label stack assembly of claim 1, wherein a shape of at least one of the plurality of tabs is distinct from others of the plurality of tabs.

* * * * *